US 10,865,710 B2

(12) United States Patent
Wang et al.

(10) Patent No.: US 10,865,710 B2
(45) Date of Patent: Dec. 15, 2020

(54) PREPARATION OF EXHAUST GAS FROM A GAS TURBINE FOR EXHAUST GAS RECIRCULATION

(71) Applicant: General Electric Technology GmbH, Baden (CH)

(72) Inventors: Wuyin Wang, Växjö (SE); Richard Joel Curran, Zurich (CH); Frank Sander, Bielefeld (DE); Klara Berg, Brugg (CH); Richard Carroni, Niederrohrdorf (CH); Gian Luigi Agostinelli, Zurich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 808 days.

(21) Appl. No.: 14/477,246

(22) Filed: Sep. 4, 2014

(65) Prior Publication Data
US 2014/0366549 A1    Dec. 18, 2014

Related U.S. Application Data

(63) Continuation of application No. PCT/IB2013/051744, filed on Mar. 5, 2013.

(30) Foreign Application Priority Data

Mar. 5, 2012  (EP) .................................. 12158053

(51) Int. Cl.
*F02C 3/34* (2006.01)
*B01D 53/96* (2006.01)
(Continued)

(52) U.S. Cl.
CPC ................ *F02C 3/34* (2013.01); *B01D 53/96* (2013.01); *F01N 3/085* (2013.01); *F23J 15/04* (2013.01);
(Continued)

(58) Field of Classification Search
CPC ...... F02C 1/08; F02C 1/10; F02C 3/34; F02C 7/08; F02C 7/141; B01D 47/14; Y10S 55/30; F23J 2219/40; F23J 15/04
(Continued)

(56) References Cited

U.S. PATENT DOCUMENTS 4,247,321 A * 1/1981 Persinger ............... B01D 53/56
423/235
4,787,323 A * 11/1988 Beer ........................ F23G 7/14
110/346
(Continued)

FOREIGN PATENT DOCUMENTS

WO    WO-9615845 A1 *  5/1996  ............. B01D 53/64

OTHER PUBLICATIONS

Elder and Plyler, "Use of Limestone—Wet Scrubbing for Reduction of Sulfur Oxide Emission from Power Plants—Facilities and Program for Prototype-Scale Testing", 1971, pp. 64-72.*
(Continued)

*Primary Examiner* — Ehud Gartenberg
*Assistant Examiner* — Stephanie Cheng
(74) *Attorney, Agent, or Firm* — Grogan, Tuccillo & Vanderleeden, LLP

(57) ABSTRACT

A method of operating a turbine unit, wherein recirculated exhaust gas is contacted with a cooling and absorption liquid in a packed bed. An exhaust gas treatment system for a turbine unit, wherein an exhaust gas recirculation line comprises a gas cooling and cleaning device having a packed bed for contacting the exhaust gas with a cooling and absorption liquid. A combined cycle power generating system, wherein an exhaust gas recirculation line comprises a gas cooling and cleaning device having a packed bed for contacting the exhaust gas from a gas turbine with a cooling and absorption liquid and wherein water utilized as a cooling medium for
(Continued)

condensation of steam originating from a steam turbine, and the cooling and absorption liquid, are passed to a cooling tower.

12 Claims, 6 Drawing Sheets

(51) Int. Cl.
    *F23J 15/04*         (2006.01)
    *F01N 3/08*          (2006.01)
    *F02C 3/30*          (2006.01)
    *F02C 7/141*         (2006.01)
    *F01K 23/10*        (2006.01)

(52) U.S. Cl.
    CPC ............ *F01K 23/10* (2013.01); *F01N 3/0885* (2013.01); *F02C 3/30* (2013.01); *F02C 7/141* (2013.01); *F05D 2260/213* (2013.01); *F05D 2270/08* (2013.01); *F23J 2219/40* (2013.01); *Y02E 20/16* (2013.01)

(58) Field of Classification Search
    USPC .......................................................... 95/235
    See application file for complete search history.

(56) References Cited

U.S. PATENT DOCUMENTS

| | | | |
|---|---|---|---|
| 6,256,976 B1 * | 7/2001 | Kataoka | .................. F02C 3/305 60/39.52 |
| 6,284,022 B1 * | 9/2001 | Sachweh | ................. B01D 47/14 95/149 |
| 7,465,843 B2 * | 12/2008 | Gnedenko | ............... F23G 5/006 204/164 |
| 7,861,511 B2 | 1/2011 | Chillar et al. | |
| 8,015,822 B2 | 9/2011 | Ranasinghe et al. | |
| 8,046,986 B2 * | 11/2011 | Chillar | .................... F01D 25/30 60/39.52 |
| 8,080,089 B1 | 12/2011 | Wen et al. | |
| 2008/0210096 A1 * | 9/2008 | Crews | .................... B01D 47/06 96/243 |
| 2009/0120088 A1 | 5/2009 | Chillar et al. | |
| 2009/0218821 A1 | 9/2009 | ElKady et al. | |
| 2010/0107592 A1 | 5/2010 | Botero et al. | |
| 2010/0180565 A1 | 7/2010 | Draper | |
| 2010/0244448 A1 * | 9/2010 | Ghani | ....................... F23K 1/02 290/52 |
| 2011/0146282 A1 | 6/2011 | Roberts | |
| 2013/0098104 A1 * | 4/2013 | Ahman | ................ B01D 5/0012 62/617 |

OTHER PUBLICATIONS

Brad Beucker, Cooling Tower Heat Transfer 101: Issue 7 and vol. 114, Power Engineering website, published Jul. 1, 2010, retrieved Jul. 13, 2020 (Year: 2010).*

* cited by examiner

PREPARATION OF EXHAUST GAS FROM A GAS TURBINE FOR EXHAUST GAS RECIRCULATION

CROSS-REFERENCE TO RELATED APPLICATIONS

This application claims priority to PCT/IB2013/051744 filed Mar. 5, 2013, which claims priority to European application 12158053.4 filed Mar. 5, 2012, both of which are hereby incorporated in their entireties.

TECHNICAL FIELD

The present application relates to a method of operating a turbine unit, to an exhaust gas treatment system for a turbine unit, and to a combined cycle power generating system.

BACKGROUND

A typical gas turbine, such as a gas turbine in a gas turbine plant for power generation, comprises a compressor for compression of inlet air, a combustor where the compressed air is mixed with fuel and where the mixture is ignited, and a turbine where exhaust gas from the combustor is expanded.

Exhaust gas emitted from a gas turbine generally comprises pollutants of environmental concern, such as carbon dioxide ($CO_2$). By a technology known as flue gas recirculation (FGR), a portion of the emitted exhaust gas is combined with "fresh" (ambient) air and recirculated to the gas turbine as inlet air. Flue gas recirculation provides for an increased concentration of $CO_2$ in the exhaust gas, thereby facilitating post combustion processes utilized to reduce $CO_2$ emissions from the gas turbine plant.

The exhaust gas from a gas turbine generally comprises $SO_x$ and other impurities and contaminants. The exhaust gas may not be directly introduced into the gas turbine, since this may cause turbine fouling and corrosion. Therefore, the recirculated exhaust gas needs to be treated prior to reintroduction into the gas turbine.

A treatment method is disclosed in U.S. Pat. No. 7,861,511, in which exhaust gas from a turbine system is apportioned between a non-recirculated exhaust stream and a recirculated exhaust stream to be recirculated to the turbine system. The recirculated exhaust stream is treated in a system comprising, e.g., heat exchangers, a scrubber and a de-mister. The scrubber may cool the exhaust gas and remove unwanted constituents, such as pollutants, therefrom. Further, a liquid reagent, for example ammonia or a limestone based liquid reagent, may be injected into the scrubber to assist removal of the constituents from the exhaust stream.

Another method of treating exhaust gas generated in a turbine system is disclosed in US 2009/0218821. As disclosed, exhaust gas is divided into a first portion to be recirculated to the turbine system and a second portion not recirculated. Conditioning of the first portion of the exhaust gas, before mixing it with ambient air and returning it to the turbine system, may include cooling, scrubbing and drying by condensing water.

It is concluded that strict requirements on the quality of the recirculation exhaust gas, e.g., on the amount of impurities, calls for alternative or improved treatments for exhaust gas to be recirculated to the gas turbine.

SUMMARY

According to aspects illustrated herein, there is provided a method of operating a turbine unit having a compressor for compression of inlet air, a combustor for combustion of a fuel with the compressed inlet air to form an exhaust gas, and a turbine for expansion of the exhaust gas, comprising recirculating at least a first portion of the exhaust gas originating from the turbine and mixing the recirculated exhaust gas with ambient air before feeding the mixture as inlet air to the compressor, characterised in that the recirculated exhaust gas is contacted with a first cooling and absorption liquid in a first packed bed, so that the temperature of the recirculated exhaust gas is lowered and contaminants are removed from the recirculated exhaust gas.

According to other aspects illustrated herein, there is provided an exhaust gas treatment system for a turbine unit, comprising a turbine unit having a compressor for compression of inlet air, a combustor for combustion of a fuel with the compressed inlet air to form an exhaust gas, and a turbine for expansion of the exhaust gas; and a recirculation line for passing at least a first portion of the exhaust gas originating from the turbine to the compressor;

characterised in that the recirculation line comprises a first gas cooling and cleaning device having a first packed bed for contacting the exhaust gas with a first cooling and absorption liquid.

The above method and system are based on the insight that utilizing a packed bed for contacting the exhaust gas with a cooling and absorption liquid has a number of benefits. As an example, the inventors have found that contacting recirculated flue gas, originating from a gas turbine, with a cooling and absorption liquid in a packed bed provides for efficient removal of contaminants such as $SO_2$ and $SO_3$, the latter of which is usually present in the recirculated flue gas in the form of an aerosol. Due to the achieved removal efficiency, the risk of corrosion of the turbine unit is decreased, and erosion and fouling issues that are common in exhaust gas recirculation (EGR) are likewise decreased.

It is further advantageous to perform cooling of the recirculated gas and absorption of contaminants in a single unit, i.e., in a packed bed of a gas cooling and cleaning device, since savings on equipment can be achieved. A packed bed type gas cooling and cleaning device may be advantageous for use in a large-scale installation. In comparison with an open spray type scrubber, a packed bed type gas cooling and cleaning device provides higher cooling and cleaning efficiencies. Furthermore, a packed bed type gas cooling and cleaning device provides better control of carryover liquid droplets than a spray scrubber.

The first cooling and absorption liquid and/or the first gas cooling and absorption device may be adapted to cool the recirculated exhaust gas from about 80-120° C., typically about 80-100° C., to about 10-50° C. or about 20-40° C.

In other words, there is provided a method for removing contaminants, such as sulphur oxides, $SO_2$ and $SO_3$, and other impurities (Na, K, etc.) from recirculating exhaust gas originating from a turbine unit, comprising contacting the recirculating exhaust gas with a cooling and absorption liquid in a packed bed.

In yet other words, there is provided use of a gas cooling and cleaning device having a first packed bed for removing contaminants, such as sulphur oxides, $SO_2$ and $SO_3$, and other impurities from recirculating exhaust gas originating from a turbine unit.

A "first cooling and absorption liquid" refers to a liquid that both decreases the temperature of the recirculated exhaust gas and reduces the amount of contaminants from the recirculated exhaust gas. Contaminants may for example be acidic gases, droplets, aerosols, and/or particulate material, such as alkaline material. As example, the contaminants may comprise sulfur dioxide, sulfur trioxide, nitrogen oxides, ammonia, chlorine, sodium, potassium, vanadium, lead, calcium, magnesium, nickel and/or zinc. Thus, the first gas cooling and cleaning device may be adapted to remove one or more of the above mentioned contaminants from the recirculated exhaust gas.

A "packed bed" may comprise a packing material that comprises a plastic, such as polypropylene, a metal or a ceramic. The packing material may be randomly packed or have a structured packing. A structured packing may enhance gas/liquid contact and may be formed from corrugated sheets.

Contacting the recirculated exhaust gas with a cooling and absorption liquid may involve bringing the gas into direct contact with such a liquid. This may cause water to condense from the exhaust gas. Thus, the first gas cooling and cleaning device may be adapted to condense water from the recirculated exhaust gas. This is advantageous in that the cooling and absorption liquid may efficiently cool the exhaust gas, and further remove much of any remaining content of sulphur oxides and impurities from the exhaust gas. The condensate water may be reused for several applications. Hence, the first gas cooling and cleaning device acts as a gas cleaning device, in addition to its function as a cooler, yielding as an end-product an exhaust gas of lower contaminant level than that of the recirculated exhaust gas entering the device.

The cooling and absorption liquid may have a pH of about 4-8.5. Such a pH is advantageous in that a cooling and absorption liquid having a pH of about 4-8.5, and more preferably a pH of about 5.0-6.5, makes the removal of sulphur oxides efficient, hence improving the gas polishing effect. Further, the cooling and absorption liquid may comprise less than 1 g/l of solids, preferably less than 0.5 or 0.1 g/l. An advantage of this is that the first gas cooling and cleaning device operating at a very low solids concentration in the cooling and absorption liquid, may reduce problems with fouling, and problems of wear. Hence, the investment and operating costs of the first gas cooling and cleaning device may be reduced.

The cleaning device having a packed bed may be a direct contact cooler (DCC).

Moreover, an $SO_3$ binding reagent, preferably in the form of a substantially homogeneous solution, may be added to, such as injected into, the exhaust gas originating from the turbine before the recirculated exhaust gas is contacted with the first cooling and absorption liquid. Accordingly, the recirculation line of the exhaust gas recirculating system may be provided with a reagent injector located upstream, with regard to the direction of gas flow through the recirculation line, of the first gas cooling and cleaning device.

Addition of an $SO_3$ binding agent to the recirculated exhaust gas before the recirculated exhaust gas is contacted with the first cooling and absorption liquid, i.e. upstream of the first gas cooling and cleaning device provides good contact between the agent and the $SO_3$ to be removed and thus facilitates binding between the agent and the $SO_3$. As further described below, addition of the $SO_3$ binding agent to the recirculated exhaust gas well before the recirculated exhaust gas is contacted with the first cooling and absorption liquid allows for advantages such as a long contacting time and thus an improved contact between the agent and the $SO_3$ to be removed.

The inventors have found that addition of an $SO_3$ binding agent before contacting the recirculated exhaust gas with the first cooling and absorption liquid is advantageous since it may further increase the amount of $SO_3$ that is removed by contacting the exhaust gas with the cooling and absorption liquid, and further allow the reagent to be washed out in the first gas cooling and cleaning device. Thus, the reagent may preferably not be present in the recirculated gas that is passed to the turbine unit.

A homogenous solution is typically a solution in which the reagent is totally dissolved. Undissolved solids may cause problems in the first gas cooling and cleaning device or if they remain in the recirculated gas when reintroduced to the turbine unit.

The reagent, such as the $SO_x$ or $SO_3$ binding reagent, may be sodium or potassium based, preferably selected from the group consisting of NaOH, KOH, $Na_2CO_3$, $NaHCO_3$, and mixtures thereof.

The recirculated exhaust gas may after having been contacted with the first cooling and absorption liquid have a total level of $SO_2$ and $SO_3$ not higher than about 150 ppbv, and/or a total level of Na and K not higher than about 5 ppbv. The recirculated exhaust gas may further have a dust content of less than 0.1 $mg/m^3$.

Moreover, a second portion of the exhaust gas originating from the turbine may be contacted with a second cooling and absorption liquid in a second packed bed, so that the temperature of the exhaust gas is lowered and contaminants are removed from the exhaust gas, and is subsequently subjected to removal of $CO_2$.

Accordingly, the exhaust gas recirculating system may further comprise a line for passing a second portion of the exhaust gas originating from the turbine to a $CO_2$ capture unit, the line comprising a second gas cooling and cleaning device having a second packed bed for contacting the exhaust gas with a second cooling and absorption liquid.

Consequently, the exhaust gas from the turbine may be split into two fractions that are treated by a first and second cooling and absorption liquid in a first and second packed bed, respectively. Treating a first portion of the exhaust gas originating from the turbine with a first cooling and absorption liquid in a first packed bed, and recirculating it to the turbine unit, increases the amount of $CO_2$ in the exhaust gas leaving the turbine unit. This means that the second portion of the exhaust gas originating from the turbine, being contacted with a second cooling and absorption liquid in a second packed bed, has a higher amount of $CO_2$, which facilitates an efficient $CO_2$ removal in a subsequent $CO_2$ capture unit. In other words, flue gas recirculation at a gas turbine plant is beneficial for a $CO_2$ capture process because both the concentration of carbon dioxide is increased and the overall mass flow to the $CO_2$ capture unit is reduced. This facilitates the use of a smaller $CO_2$ capture unit and results in a more efficient $CO_2$ capture process.

The second cooling and absorption liquid, or the second gas cooling and cleaning device, may be adapted to remove contaminants selected from sulfur dioxide, sulfur trioxide, nitrogen oxides, chlorine, sodium, potassium, vanadium, lead, calcium, magnesium, nickel and/or zinc from the exhaust gas. The second cooling and absorption device is preferably adapted to decrease at least the amounts of $SO_x$ ($SO_2$ and/or $SO_3$) and $NO_2$. After having been contacted with the second cooling and absorption liquid, the exhaust gas, i.e. the flue gas leaving the second gas cooling and cleaning device being directed to a $CO_2$ capture unit, may have a total level of $SO_2$ and $SO_3$ of about 1-5 ppmv and/or a level of $NO_2$ of about 1-5 ppmv.

The second cooling and absorption liquid and/or the second gas cooling and absorption device, treating gas that is further directed to a $CO_2$ capture unit, may be adapted to cool the recirculated exhaust gas to about 10-50° C.

Consequently, the gas quality requirements for gas recirculated to the turbine unit may be different from the gas quality requirements for the gas directed to a $CO_2$ capture unit. Treating such gas portions separately is advantageous in that it may result in a more efficient cleaning and cooling with regard to consumables (energy, additives etc.) and investment cost.

In the case that an $SO_3$ binding agent is added, the $SO_3$ binding agent may be added before the second portion of the exhaust gas is contacted with the second cooling and absorption liquid. Thus, in the case the recirculation line is provided with a reagent injector, the line for passing a second portion of the exhaust gas to the $CO_2$ capture unit may bifurcate from the recirculation line at a bifurcation point and the reagent injector be located upstream of the bifurcation point. Injection of the $SO_3$ binding agent before splitting the exhaust gas into the first and second portions provides an opportunity to improve $SO_3$ reduction not only of the first gas portion recirculated to the turbine unit but also from the second gas portion directed to the $CO_2$ capture unit. Also, by injecting the $SO_3$ binding agent at a generally early position it is provided a generally longer contacting time between the $SO_3$ binding agent and the exhaust gas.

As an alternative, a portion of the recirculated exhaust gas having been contacted with the first cooling and absorption liquid may be subsequently subjected to removal of $CO_2$. Consequently, in the exhaust gas recirculating system, the recirculation line may be connected, downstream, with regard to the direction of gas flow through the recirculation line, of the first gas cooling and cleaning device, with a line for passing a portion of the exhaust gas to a $CO_2$ capture unit.

Hence, the recirculated flue gas may be split into portions after having been contacted with the first cooling and absorption liquid or the first gas cooling and cleaning device, respectively. This may thus reduce the need for contacting the exhaust gas portion passed to $CO_2$ capture with a second cooling and absorption liquid, or for passing such exhaust gas portion to a second gas cooling and cleaning device, respectively.

Optionally, after having been contacted with the first cooling and absorption liquid, the recirculated exhaust gas fed to the compressor may be subjected to further heat exchange. It is thus an option that the recirculation line further comprises a heat exchanger arranged to change the temperature of the recirculated exhaust gas fed to the compressor. Depending on the temperature requirements for exhaust gas returned to the turbine unit and for exhaust gas passed to $CO_2$ capture, respectively, such heat exchange may be suitable or advantageous. The acceptable temperature of the exhaust gas recirculated to the turbine unit depends also on the exhaust gas recirculation ratio. The temperature of the recirculated exhaust gas that passed the first gas cooling and cleaning device will typically be in the range of about 10-50° C. or, considering a rather high exhaust gas recirculation ratio, preferably below about 40° C., such as about 20-40° C.

Further heat exchange of the recirculated exhaust gas fed to the compressor may involve cooling or heating of said gas, typically cooling. Such further heat exchange may be arranged for indirect heat exchange or for direct contact heat exchange. In the latter case, said heat exchanger may be arranged to perform cleaning and cooling of the gas in the same way as the gas cooling and cleaning devices described herein.

Furthermore, at least a portion of the first and/or second cooling and absorption liquid that has been contacted with the recirculated exhaust gas may be fed to a cooling tower as make-up water.

Accordingly, the exhaust gas recirculating system may further comprise a cooling circuit for cooling of first and/or second cooling and absorption liquid utilized by the first and/or second gas cooling and cleaning device, respectively, and returning cooled liquid to the first and/or second gas cooling and cleaning device, the cooling circuit comprising a cooling tower for removal of heat from said first cooling and absorption liquid.

Thus, the cooling and absorption liquid that has been used for lowering the temperature of the recirculated exhaust gas may be cooled by means of a cooling tower. Thus, the cooling and absorption liquid may be reused for lowering the temperature of the recirculated exhaust gas, and for absorption of impurities from the recirculated exhaust gas, after heat has been removed from the used cooling and absorption liquid in a cooling tower. The cooling tower referred to herein may be a cooling tower that is also lowering the temperature of cooling water used in a condenser for steam originating from a steam turbine. Commonly, hot exhaust gas from a turbine unit as described above is used for producing steam, typically in a heat recovery steam generator (HRSG), which steam is expanded through a steam turbine to generate additional power and is subsequently condensed and returned to the HRSG. Typically, the alkalinity of the water cooled in such a cooling tower must be controlled to ensure operability. On one hand, the cooling and absorption liquid as described above has been found to provide a means for such control. On the other hand, cooled liquid returned from the cooling tower has been found to have a suitable alkalinity to serve as the cooling and absorption liquid described above. The condensate from the exhaust gas streams can serve as make-up water for the cooling tower, reducing the need for, e.g., using surface water as make-up water for the cooling tower. Thus, the first and/or second cooling and absorption liquid may advantageously be integrated into the cooling systems of a turbine power plant.

Referring again to the properties of the recirculated exhaust gas originating from the turbine, such exhaust gas may have a level of $SO_2$ of from about 0.5 ppmv to about 5 ppmv, and/or a level of $SO_3$ of from about 0.5 ppmv to about 5 ppmv.

According to other aspects mentioned herein, there is provided a combined cycle power generating system comprising a gas turbine unit having a compressor for compression of inlet air, a combustor for combustion of a fuel with the compressed inlet air to form an exhaust gas, and a gas turbine for expansion of the exhaust gas;

a steam generator utilizing heat of the exhaust gas originating from the gas turbine for generation of steam, a steam turbine for expansion of the steam generated by the steam generator, a condenser utilizing water as a cooling medium for condensation of the steam originating from the steam turbine;

a first cooling circuit for cooling of water utilized as a cooling medium by the condenser and returning said water to the condenser, the first cooling circuit comprising a cooling tower for removal of heat from said water, and a recirculation line for passing at least a first portion of the exhaust gas originating from the gas turbine to the compressor;

characterised in that the recirculation line comprises a first gas cooling and cleaning device having a first packed bed for contacting the first portion of the exhaust gas with a first cooling and absorption liquid, and in that the system further comprises a second cooling circuit for cooling of the first cooling and absorption liquid utilized by the first gas cooling and cleaning device and returning it to the first gas cooling and cleaning device, the second cooling circuit comprising said cooling tower of the first cooling circuit for removal of heat from said first cooling and absorption liquid.

Moreover, the combined cycle power generating system may further comprise a line for passing a second portion of the exhaust gas originating from the gas turbine to a $CO_2$ capture unit, the line comprising a second gas cooling and cleaning device having a second packed bed for contacting the second portion of the exhaust gas with a second cooling and absorption liquid.

As an alternative, the recirculation line may be connected, downstream, with regard to the direction of gas flow through the recirculation line, of the first gas cooling and cleaning device, with a line for passing a portion of the exhaust gas to a $CO_2$ capture unit. It is then an option that the recirculation line further comprises a heat exchanger arranged to change the temperature of the recirculated exhaust gas that is fed to the compressor.

Further, the recirculation line may be provided with a reagent injector located upstream, with regard to the direction of gas flow through the recirculation line, of the first gas cooling and cleaning device. In the case the recirculation line is provided with a reagent injector, the line for passing a second portion of the exhaust gas to the $CO_2$ capture unit may bifurcate from the recirculation line at a bifurcation point and the reagent injector be located upstream of the bifurcation point.

The above described and other features are exemplified by the following figures and detailed description.

BRIEF DESCRIPTION OF THE DRAWINGS

FIG. 4 shows a schematic example of a system comprising a gas cooling and cleaning device connected to a cooling circuit for the cooling and absorption liquid.

FIG. 5 shows a further schematic example of a system comprising a gas cooling and cleaning device connected to a cooling circuit for the cooling and absorption liquid.

DETAILED DESCRIPTION

Figure 1:
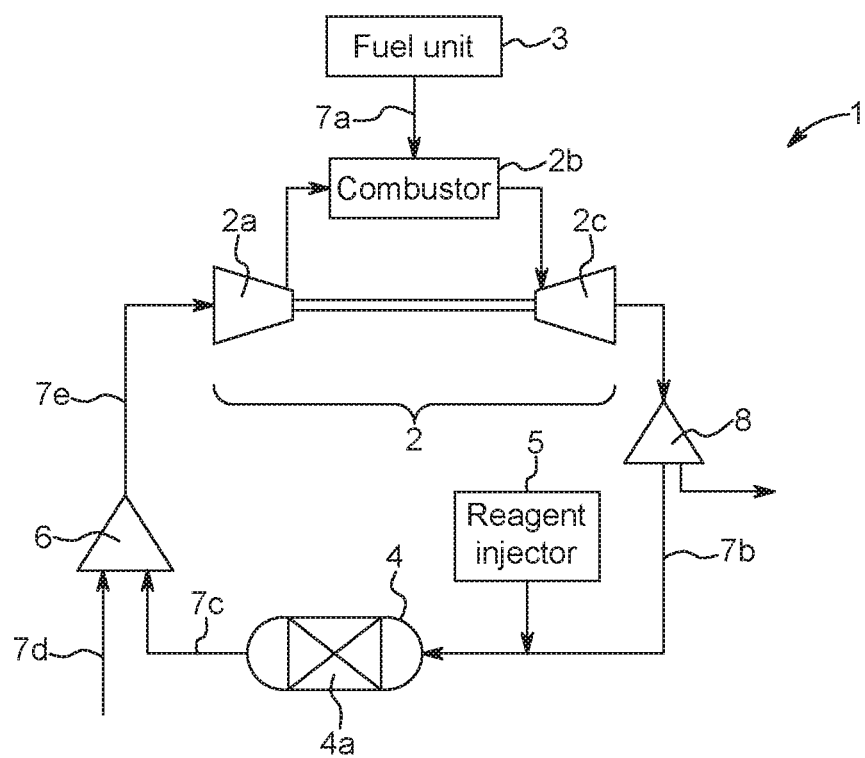
FIG. 1 shows a schematic example of an exhaust gas treatment system for a turbine unit.

FIG. 1 shows a schematic example of an exhaust gas treatment system 1 for a turbine unit 2. The system 1 comprises a turbine unit 2, which comprises a compressor 2a for compression of inlet air, a fluidly connected combustor 2b for combustion of a fuel with the compressed inlet air to form an exhaust gas, and a fluidly connected turbine 2c for expansion of the exhaust gas. Fuel from fuel unit 3 is added to or mixed with the compressed inlet air from the compressor 2a via fluidly connected fuel line 7a. At least a portion of the generated exhaust gas leaves turbine 2c via a heat recovery steam generator (HRSG, not shown) and is then passed via a flow divider 8 and fluidly connected recirculation line 7b to a gas cooling and cleaning device 4, which comprises a packed bed 4a. A reagent injector 5 is located upstream, with regard to the direction of gas flow through the recirculation line 7b, of the gas cooling and cleaning device 4. The reagent injector 5 injects a $SO_3$ binding reagent, in the form of a homogeneous solution, into the recirculated exhaust gas in line 7b before the recirculated exhaust gas is contacted with the first cooling and absorption liquid in the cooling and cleaning device 4. The temperature of the recirculated exhaust gas is lowered from about 80-100° C. to about 10-50° C. and contaminants are removed from the recirculated exhaust gas in the cooling and cleaning device 4. The recirculated gas leaves the gas cooling and cleaning device 4 in fluidly connected line 7c and is mixed in mixer 6 with ambient air from fluidly connected line 7d. The mixture of recirculated gas mixed with ambient air in line 7e is used as inlet air for the fluidly connected turbine unit 2.

Figure 2:
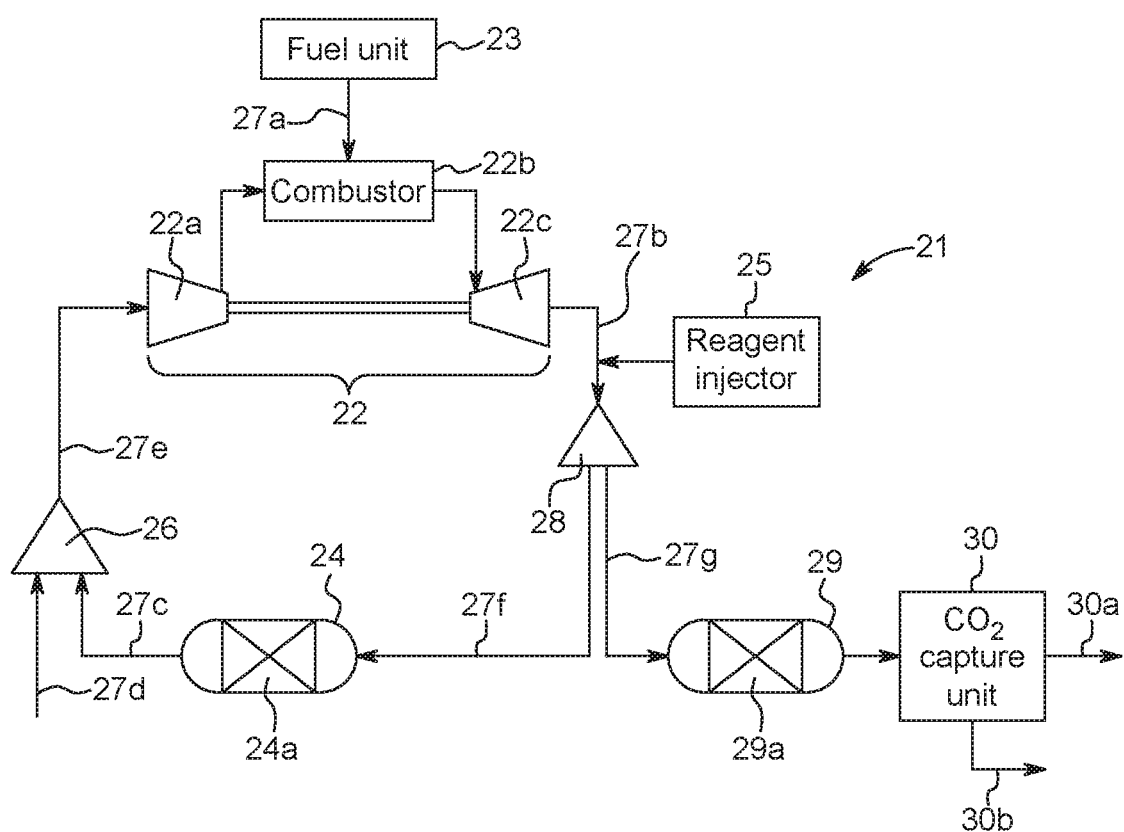
FIG. 2 shows a schematic example of an exhaust gas treatment system for a turbine unit that also comprises a $CO_2$ capture unit.

FIG. 2 shows a schematic example of an exhaust gas treatment system 21 for a turbine unit 22, the system also comprising a $CO_2$ capture unit 30. In accordance with the system 1 discussed in relation to FIG. 1, the system 21 comprises a turbine unit 22, which in turn comprises a compressor 22a for compression of inlet air, a fluidly connected combustor 22b for combustion of a fuel with the compressed inlet air to form an exhaust gas, and a fluidly connected turbine 22c for expansion of the exhaust gas. Fuel from fuel unit 23 is added to or mixed with the compressed gas from the compressor 22a via fluidly connected fuel line 27a. At least a portion of the generated exhaust gas leaves turbine 22c via fluidly connected recirculation line 27b and passes a heat recovery steam generator (HRSG, not shown) before being split in a divider 28 into a first portion flowing through fluidly connected line 27f to a first gas cooling and cleaning device 24 and into a second portion flowing through fluidly connected line 27g to a second gas cooling and cleaning device 29. Each gas cooling and cleaning device 24 and 29 comprises a packed bed 24a, 29a.

Similar to the system 1 described in relation to FIG. 1 above, a reagent injector 25 is located upstream, with regard to the direction of gas flow through the recirculation line 27b, of the first gas cooling and cleaning device 24. The reagent injector injects a $SO_3$ binding reagent, in the form of a homogeneous solution, into the recirculated exhaust gas in line 27b before the recirculated exhaust gas is contacted with the first cooling and absorption liquid in the cooling and cleaning device 24. The position of the reagent injector 25 upstream of the divider 28 results in treatment of both the first and the second portions of the recirculated gas with the $SO_3$ binding agent. As an alternative, it is possible to utilize the reagent injector 25 for treatment only of the first portion of the recirculated exhaust gas by locating the reagent injector 25 downstream of the divider 28 so that it injects into the recirculated exhaust gas in line 27f. It is to be understood that, particularly in the latter case, a second reagent injector (not shown) may be located upstream, with regard to the direction of gas flow through the line 27g, of the second gas cooling and cleaning device 29. The second reagent injector may thus inject a $SO_3$ binding reagent, preferably in the form of a homogeneous solution, into the recirculated exhaust gas in line 27g before the recirculated exhaust gas is contacted with the second cooling and absorption liquid in the cooling and cleaning device 29.

The recirculated exhaust gas leaves the first gas cooling and cleaning device 24 in fluidly connected line 27c and is mixed in mixer 26 with ambient air from fluidly connected line 27d. The mixture of recirculated gas with ambient air flows through fluidly connected line 27e and is used as inlet air for the turbine unit 22.

The temperature of the portion of exhaust gas fed through line 27g is lowered and contaminants are removed from said portion by the second cooling and cleaning device 29. Exhaust gas leaving the second cooling and cleaning device 29 is directed to a fluidly connected $CO_2$ capture unit 30, which decreases the amount of $CO_2$ in the exhaust gas. Removed $CO_2$ is directed from the $CO_2$ capture unit 30 via fluidly connected line 30b, whereas the remaining exhaust gas flows to a stack (not shown) in fluidly connected line 30a.

Figure 3:
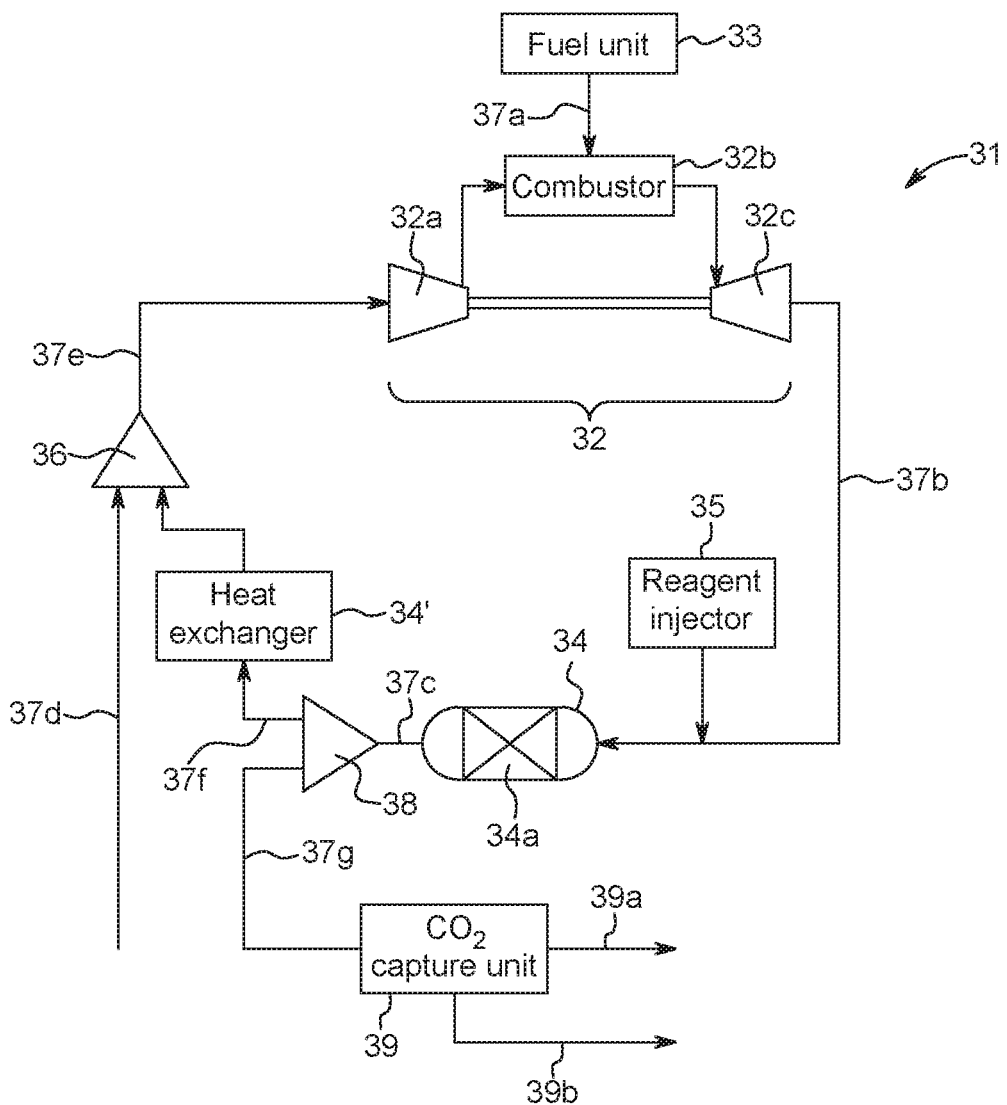
FIG. 3 shows a further schematic example of an exhaust gas treatment system for a turbine unit that also comprises a $CO_2$ capture unit.

FIG. 3 shows an alternative schematic example of an exhaust gas treatment system 31 for a turbine unit 32, the system also comprising a $CO_2$ capture unit 39. The turbine unit 32, comprising a compressor 32a, a fluidly connected combustor 32b and a fluidly connected turbine 32c, as well as a fuel unit 33 and a fluidly connected fuel line 37a, function as described in relation to FIGS. 1 and 2. Exhaust gas is recirculated in fluidly connected recirculation line 37b via a heat recovery steam generator (HRSG, not shown) to a fluidly connected gas cooling and cleaning device 34, which comprises a packed bed 34a. As described in relation to FIGS. 1 and 2, a reagent injector 35 is located upstream, with regard to the direction of gas flow through the recirculation line 37b, of the gas cooling and cleaning device 34. However, in this example, recirculated exhaust gas leaving the gas cooling and cleaning device 34 in line 37c is split in divider 38 into a portion flowing through fluidly connected line 37g to a $CO_2$ capture unit 39 and another portion flowing through fluidly connected line 37f to mixer 36 for mixing with ambient air from fluidly connected line 37d and subsequent use via fluidly connected line 37e as inlet air for the turbine unit 32. Should the temperature of the exhaust gas leaving the gas cooling and cleaning device 34 be too high to meet the requirements for inlet air for the turbine unit 32, the portion of recirculated exhaust gas directed for subsequent use as inlet air to the turbine unit 32 may pass in fluidly connected line 37f to an optional heat exchanger 34' for further cooling. The optional heat exchanger 34' may be another gas cooling and cleaning device or an indirect heat exchanger.

The $CO_2$ capture unit 39 decreases the amount of $CO_2$ in the exhaust gas. Removed $CO_2$ exits the $CO_2$ capture unit 39 via fluidly connected line 39b, whereas the remaining exhaust gas flows to a stack (not shown) via fluidly connected line 39a. Thus, in this example, the $CO_2$ capture unit 39 is located downstream of the gas cooling and cleaning device 34, with regard to the direction of gas flow through the recirculation line 37e. Hence, exhaust gas having been contacted with the cooling and absorption liquid in the gas cooling and cleaning device 34 is subsequently subjected to $CO_2$ removal.

Figures 4, 5:
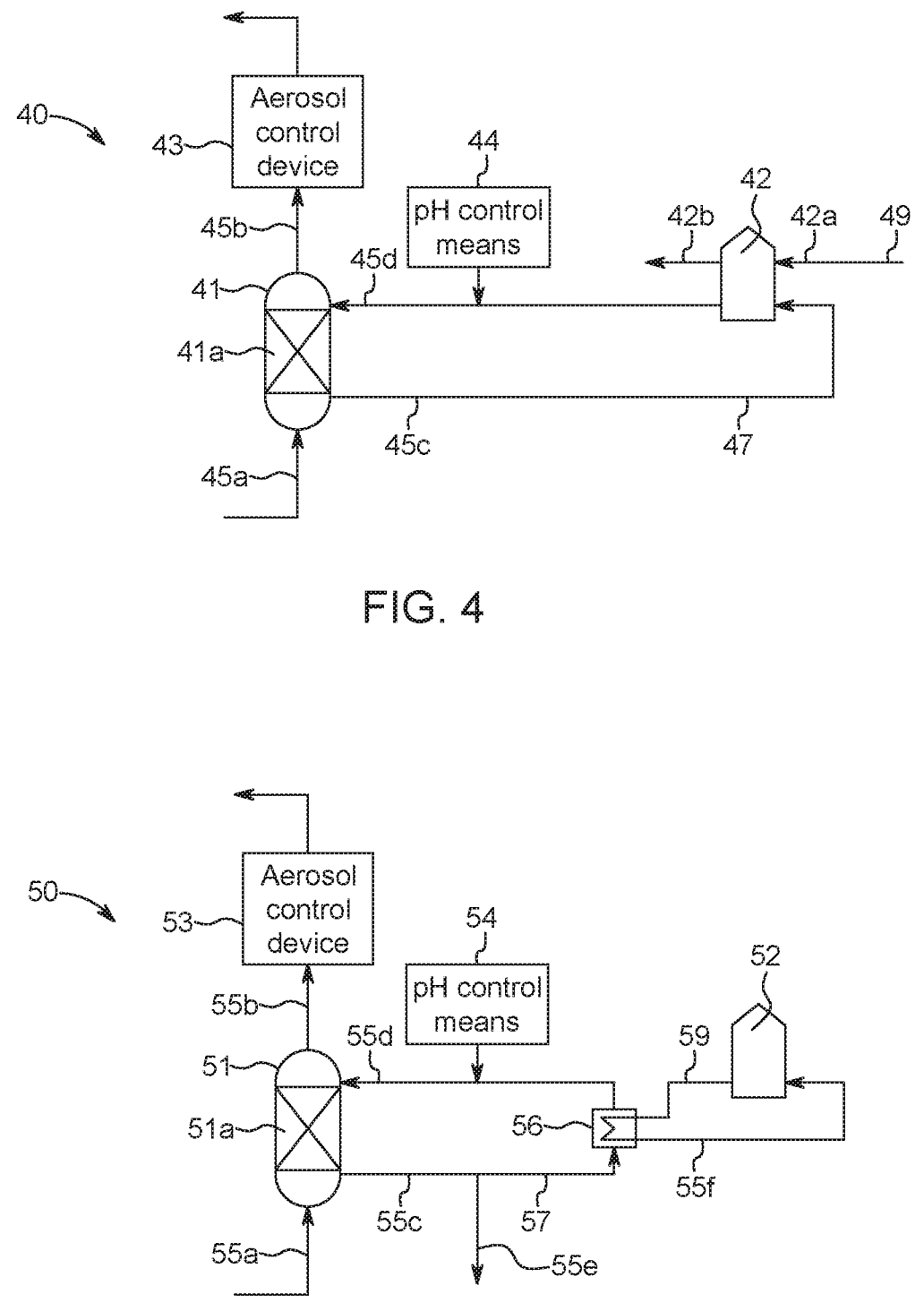

FIG. 4 shows a schematic example of a system 40 comprising a gas cooling and cleaning device 41 fluidly connected to a cooling circuit 47 for the cooling and absorption liquid. Recirculated exhaust gas enters at the bottom of the vertical cooling and cleaning device 41 via fluidly connected line 45a and, after having been contacted with the cooling and absorption liquid in at least one packed bed 41a, so that the temperature of the recirculated exhaust gas is lowered and contaminants are removed from the recirculated exhaust gas, leaves the device 41 via fluidly connected line 45b. An aerosol control device 43 is arranged to control the aerosol content of the exhaust gas leaving the device 41. The cooling and absorption liquid of the gas cooling and cleaning device 41 is circulated in the fluidly connected cooling circuit 47 comprising fluidly connected feed line 45c, cooling tower 42 for dissemination of heat from the cooling and absorption liquid and return line 45d. Cooling and absorption liquid enters the gas cooling and cleaning device 41 via fluidly connected return line 45d, so that the cooling and absorption liquid contacts the exhaust gas in the device 41 in a counter current flow, i.e. the cooling and absorption liquid flows through the device 41 in the opposite direction as the flow of the recirculated exhaust gas. Consequently, after having lowered the temperature of the exhaust gas, and having absorbed impurities from the exhaust gas, the cooling and absorption liquid leaving the device 41 via feed line 45c has a higher temperature than the cooling and absorption liquid entering the device 41 via return line 45d. The temperature of the cooling and absorption liquid in feed line 45c is decreased in cooling tower 42. In the system 40, the cooling and absorption liquid in feed line 45c serves as make-up water for the cooling tower 42, whereas a main flow of water to be cooled is passed via the cooling tower 42 in a fluidly connected circuit 49 with a feed line 42a and a return line 42b (shown schematically only). Thus, resulting acidic make-up water may be used and beneficially reduce scaling prone to develop in case the main flow of water for cooling is alkaline. Also, an alkaline main flow of water may benefit the cooling and absorption liquid for absorption of acidic contaminants in the cooling and cleaning device 41. Control of the pH of the cooling and absorption liquid is performed by a pH control means 44, which may for example supply a substance to the cooling circuit 47 for adjusting the pH of the cooling and absorption liquid. As an example, an alkaline or an acidic substance may be added to the cooling and absorption liquid.

FIG. 5 shows an alternative schematic example of a system 50 comprising a gas cooling and cleaning device 51 fluidly connected to a cooling circuit 57 for the cooling and absorption liquid. Recirculated exhaust gas enters at the bottom of the vertical cooling and cleaning device 51 via fluidly connected line 55a and, after having been contacted with the cooling and absorption liquid in at least one packed bed 51a, so that the temperature of the recirculated exhaust gas is lowered and contaminants are removed from the recirculated exhaust gas, leaves the device 51 via fluidly connected line 55b. An aerosol control device 53 is arranged to control the aerosol content of the exhaust gas leaving the device 51. A heat exchanger 56 is present in the cooling circuit 57 for cooling of the cooling and absorption liquid flowing through fluidly connected feed line 55c and return line 55d. In the heat exchanger 56, the cooling and absorption liquid is in thermal contact with a cooling medium circulating in a second cooling circuit 59. In the system of FIG. 5, the cooling circuit 59 comprises a fluidly connected line 55f and a cooling tower 52 for dissemination of heat from the cooling medium. Thus, the cooling medium of the cooling circuit 59 decreases the temperature of the cooling and absorption liquid via the heat exchanger 56, such that the cooling and absorption liquid in return line 55d has a lower temperature compared to the cooling and absorption liquid in feed line 55c. In other words, the cooling and absorption liquid is indirectly cooled through an intermediate heat exchanger 56. The cooling medium supplied to the heat exchanger 56 typically has a temperature of 0-30° C., hence cooling the cooling and absorption liquid of cooling circuit 57 to, typically, 2-35° C.

SO$_2$ and SO$_3$ becoming dissolved in the cooling and absorption liquid of the cooling and cleaning device 51 will result in a decrease in the pH value of the cooling and absorption liquid. The set point for the pH-value is typically pH 4-6.5, more preferably pH 4.5-6. Such a set point has been found to provide efficient removal of sulphur oxides, without a large and unwanted removal of carbon dioxide from the recirculated exhaust gas. Control of the pH of the cooling and absorption liquid is performed by a pH control means 54, which may for example supply a substance to the cooling circuit 57 for adjusting the pH of the cooling and absorption liquid. As an example, an alkaline or an acidic substance may be added to the cooling and absorption liquid. Further, a bleed may be removed from the cooling circuit 57 via a fluidly connected line 55*e*.

The systems 40 and 50 comprising cooling circuits as shown in FIGS. 4 and 5 may be used for any of the gas cooling and cleaning devices of the exhaust gas treatment systems of FIGS. 1-3.

Figure 6:
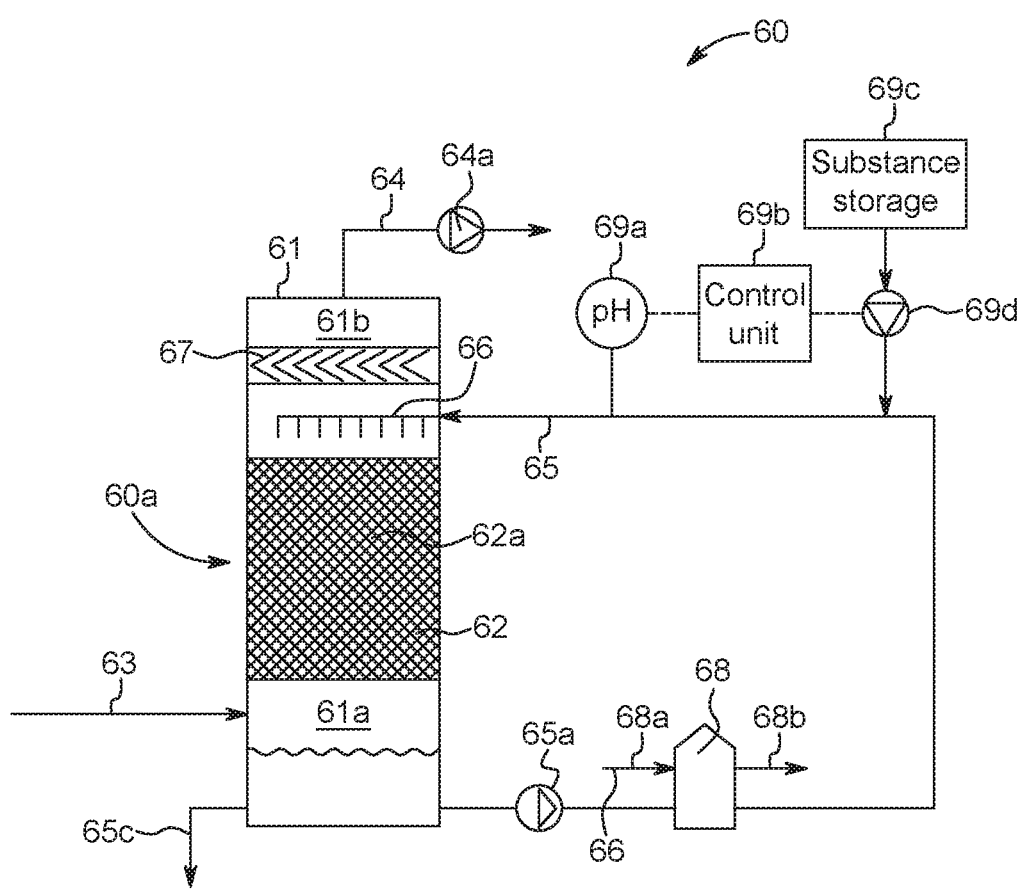
FIG. 6 shows an example of a gas cooling and cleaning device comprising a packed bed and a cooling circuit for the cooling and absorption liquid.

FIG. 6 illustrates a system 60 comprising a gas cooling and cleaning device 60*a*, in the form of a condenser, in more detail. The gas cooling and cleaning device 60*a* comprises a tower 61, which is filled with a packing material 62*a* forming a packed bed 62, for providing good contact between the recirculated exhaust gas, entering through a duct 63, and the cooling and absorption liquid being circulated in the tower 61 by means of a pump 65*a* in a fluidly connected circulation pipe 65. The packing material 62*a* of the packed bed 62 could be of a structured packing type, such as Mellapak™ Plus, available from Sulzer Chemtech USA Inc, Tulsa, Okla., USA, or a random packing type, such as Jaeger™ Tri-Pack, available from Jaeger Products, Inc, Houston, Tex., USA. A liquid distributor 66 is operative for distributing the cooling liquid over the packing material 62*a*. In this case, the cooling liquid comprises mainly water, which is brought into direct contact with the exhaust gas. The liquid distributor 66, which may be, for example, Jaeger™ Model LD3 or Model LD4, which are available from Jaeger Products, Inc, Houston, Tex., USA, distributes the liquid evenly over the packing material 62*a* of the packed bed 62 without causing an undue formation of small liquid droplets.

The recirculated exhaust gas is supplied, via fluidly connected duct 63, to the lower end 61*a* of the tower 61 and moves vertically upwardly through the tower 61, being brought into contact, in a counter-current flow manner, with the cooling and absorption liquid flowing downwardly through the packing material 62*a* of the packed bed 62. At the upper end 61*b* of the tower 61*a* mist eliminator 67 is arranged. The mist eliminator 67 is operative for removing liquid droplets from the exhaust gas. The recirculated exhaust gas leaves the tower 61 of the cooling and cleaning device 60*a* via a fluidly connected outlet duct 64. A fan 64*a* is operative for forwarding the flow of cleaned recirculated exhaust gas, e.g., to be mixed with ambient air and further introduced into the inlet of a turbine unit.

Through circulation pipe 65, cooling and absorption liquid flows to a cooling tower 68, similarly to the system illustrated in FIG. 4. In the system 60, the fluidly connected cooling tower 68 is operative for cooling of the cooling and absorption liquid flowing through circulation pipe 65 as well as for cooling of a main flow of water passed via the cooling tower 68 in fluidly connected circuit 66 comprising fluidly connected feed line 68*a* and return line 68*b* (shown schematically only).

Control of the pH of the cooling and absorption liquid introduced in the tower 61 is performed by a pH-sensor 69*a* operative for measuring the pH of the cooling and absorption liquid forwarded through circulation pipe 65. A control unit 69*b* is operative for receiving a signal from the pH-sensor 69*a*. The control unit 69*b* is operative for controlling the supply of alkaline or acidic substance from a fluidly connected substance storage 69*c*. Hence, the control unit 69*b* is operative for comparing the pH as measured by means of the pH sensor 69*a* to a pH set point. When the pH measured by the pH sensor 69*a* differs from the pH set point, the control unit 69*b* sends a signal to a supply device (not shown) and associated pump 69*d* to feed acidic or alkaline substance from storage 69*c* to the fluidly connected circulation pipe 65 in order to adjust the pH of the cooling and absorption liquid towards the pH set point.

The cooling tower 68 is operative for cooling the cooling and absorption liquid flowing in the circulation pipe 65 to, typically, 2-35° C. In the packed bed 62 of the tower 61 the recirculated flue gas is cooled, upon direct contact with the cooling and absorption liquid, to a temperature of typically 3-40° C. As an example, if the exhaust gas leaving the tower 61 is to be further mixed with ambient air and reintroduced into a turbine unit, the temperature of the exhaust gas leaving the tower 61 may be about 10-50° C., and if the exhaust gas leaving the tower 61 is to be further introduced in a CO$_2$ capture unit, the temperature of the exhaust gas leaving the tower 61 may be about 10-50° C.

As a result of this cooling of the recirculated exhaust gas, being a cooling to a temperature below the saturation temperature with respect to water vapour, water condenses in the tower 61 of the cooling and cleaning device 60*a*. Hence, the recirculated exhaust gas leaving the tower 61 via the fluidly connected duct 64 may have a water content of only 0.5 to 8% by volume.

The direct contact between the cooling liquid and the exhaust gas at the packed bed 62 of the tower 61 of the cooling and cleaning device 60*a* will also result in a removal of SO$_2$ and SO$_3$. Hence, the recirculated exhaust gas leaving via the duct 64 may typically have a concentration of SO$_x$, i.e., a total concentration of SO$_2$ and SO$_3$, of lower than 150 ppbv.

The cooling and absorption liquid circulated by means of the pump 65*a* in the tower 61 of the cooling and cleaning device 60*a* is preferably a clear liquid, meaning that only small amounts of solids are contained in the circulating liquid. Preferably, the amount of solids in the cooling and absorption liquid is less than 1 g/l, preferably less than 0.5 or 0.1 g/l. An advantage of having a low concentration of solids in the liquid circulating in the tower 61 is that re-use and cleaning of the condensate water leaving the tower 61 via the fluidly connected pipe 65*c* becomes less difficult, compared to a condensate water being mixed with a high concentration of solid particles. To achieve a low amount of solids in the cooling and absorption liquid circulating in the tower 61, the alkaline substance preferably has a high solubility in water and at lower temperatures. Preferably, the alkaline substance which is stored in the storage 69*c* and utilized for controlling the pH of the cooling and absorption liquid circulating in the tower 61 of the cooling and cleaning device 60*a* has a solubility in water, at a temperature of 20° C., of at least 50 g/l, more preferably at least 100 g/l at 20° C. Examples of suitable alkaline substances include sodium hydroxide (NaOH), potassium hydroxide (KOH), sodium carbonate (Na$_2$CO$_3$), and sodium bicarbonate (NaHCO$_3$). Often, the most preferred alkaline substance is sodium hydroxide (NaOH).

The recirculated exhaust gas is then passed through the mist eliminator 67 removing most of the liquid droplets that might have been entrained with the exhaust gas flow. The recirculated exhaust gas then leaves the tower 61 of the cooling and cleaning device 60*a* via the fluidly connected duct 64.

The disclosed method and system for treating exhaust gas originating from a turbine unit may be utilized in a combined cycle power generating system comprising exhaust gas recirculation (EGR) in combination with a carbon capture system (CCS). A first portion of the exhaust gas from the gas turbine (GT) may be recirculated back to the gas turbine, and a second portion of the exhaust gas may be transported to the CCS. The first and second portions of the exhaust gas are treated before being directed to the GT and the CCS, respectively. Since requirements (e.g. gas temperature, content of pollutants) differ between the two portions, a first gas cleaning system may be arranged for cleaning and cooling the first portion of the exhaust gas, and a second gas cleaning and cooling system may be arranged for cleaning and cooling the second portion of the exhaust gas.

Figure 7:
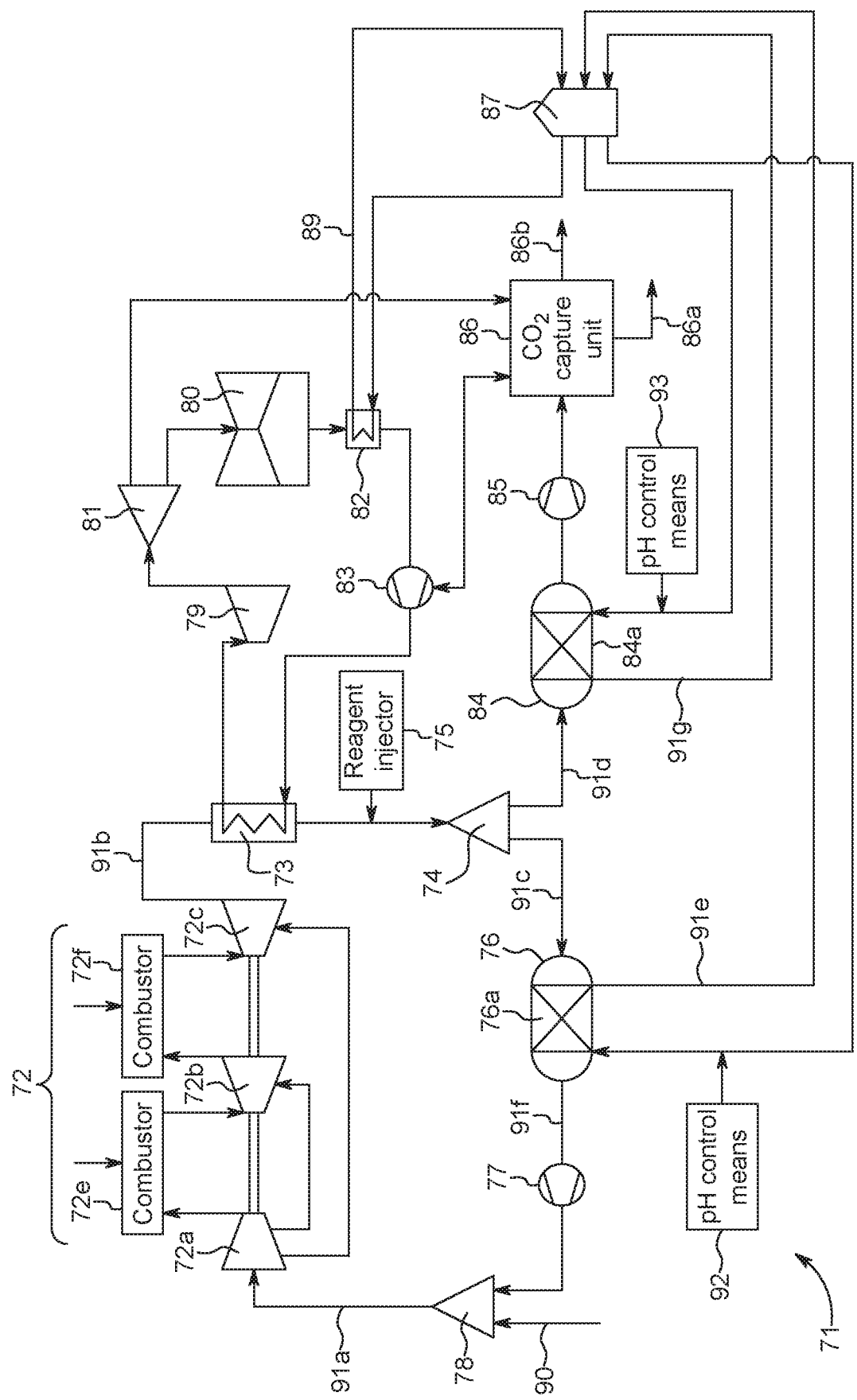
FIG. 7 shows a schematic example of a combined cycle power generating system.

FIG. 7 shows a schematic example of such a combined cycle power generating system 71 comprising exhaust gas recirculation (EGR) in combination with a carbon capture system (CCS). Turbine unit 72, comprising a compressor 72*a*, a high pressure turbine 72*b* and a low pressure turbine 72*c* as well as combustors 72*e* and 72*f*, generates power through the expansion of exhaust gas. Generated exhaust gas leaves the turbine unit 72 in fluidly connected line 91*b* and enters a fluidly connected heat recovery steam generator (HRSG) 73.

The exhaust gas in line 91*b* is divided, downstream of the HRSG 73, in divider 74 into a first portion that flows through fluidly connected line 91*c* to a first cooling and cleaning device 76, and into a second portion that flows through fluidly connected line 91*d* to a second cooling and cleaning device 84. Both the first cooling and cleaning device 76 and the second cooling and cleaning device 84 are direct contact coolers (DCC), comprising a packed bed 76*a*, 84*a*.

A reagent injector 75 is located upstream, with regard to the direction of gas flow through lines 91*b*, 91*c*, of the first gas cooling and cleaning device 76. In the system 71, the reagent injector 75 is located upstream of the divider 74 but it may also be located downstream of the divider 74. The reagent injector injects a $SO_3$ binding reagent, in the form of a homogeneous solution, into the recirculated exhaust gas in line 91*b* or 91*c* before the recirculated exhaust gas is contacted with a first cooling and absorption liquid in the first cooling and cleaning device 76. The temperature of the recirculated exhaust gas is lowered and contaminants are removed from the recirculated exhaust gas in the cooling and cleaning device 76.

The first cooling and absorption liquid is circulated in line 91*e* to a cooling tower 87 that lowers the temperature of the first cleaning and absorption liquid. pH control means 92 controls the pH of the first cooling and absorption liquid that enters the first cooling and absorption device 76.

Cleaned and cooled recirculated exhaust gas leaves the first gas cooling and cleaning device 76 in fluidly connected line 91*a* and is directed by blower 77 to mixer 78, where it is mixed with ambient air from fluidly connected line 90. The recirculated exhaust gas mixed with ambient air in line 91*a* is used as inlet air for the turbine unit 72.

The second portion of the exhaust gas, in line 91*d*, enters the second cooling and absorption device 84, where the amount of contaminants in the exhaust gas is decreased and the temperature of the exhaust gas is reduced. Since the first portion of the exhaust gas is recirculated back to the turbine unit 72, there is a build-up of $CO_2$ in the exhaust gas. Hence, the content of $CO_2$ in the exhaust gas entering the second cooling and cleaning device 84 is higher than if no recirculation occurred. The exhaust gas is directed to a $CO_2$ capture unit 86 by blower 85. Removed $CO_2$ exits the $CO_2$ capture unit 86 in fluidly connected line 86*a* whereas the remaining exhaust gas is sent to a stack (not shown) in fluidly connected line 86*b*.

The second portion of the exhaust gas is contacted with a second cooling and absorption liquid in the second cooling and cleaning device 84. The second cooling and absorption liquid is circulated in fluidly connected line 91*g* to the cooling tower 87 to lower the temperature of the cooling and absorption liquid. pH control means 93 controls the pH of the second cooling and absorption liquid that enters the second cooling and absorption device 84.

Steam generated in the HRSG 73 is utilized for further power generation in steam turbine 79 and, via a splitter 81, in steam turbine 80. The steam is subsequently condensed in a fluidly connected condenser 82 and returned by a pump 83 to the HRSG 73. A cooling medium is passed through the condenser 82 in a cooling circuit 89. The cooling circuit 89 is fluidly connected to cooling tower 87.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method of operating a turbine unit having a compressor for compression of inlet air, a combustor for combustion of a fuel with the compressed inlet air to form an exhaust gas, and a turbine for expansion of the exhaust gas, comprising recirculating at least a first portion of the exhaust gas originating from the turbine and mixing the recirculated exhaust gas with ambient air before feeding the mixture as inlet air to the compressor, wherein the recirculated exhaust gas is contacted with a first cooling and absorption liquid in a counter current flow in a first packed bed of a first gas cooling and cleaning device to perform cooling and absorption of the recirculated exhaust gas in the first packed bed, to lower a temperature of the recirculated exhaust gas from between about 80° C. to about 120° C. to between about 10° C. to about 50° C. within the first packed bed and to remove contaminants from the recirculated exhaust gas; and wherein an S03 binding reagent is added to the exhaust gas originating from the turbine before the recirculated exhaust gas is contacted with the first cooling and absorption liquid, wherein the method further includes:

feeding a primary supply of cooling water to a cooling tower for condensation of steam from a steam turbine;

feeding at least a portion of the first cooling and absorption liquid that has been contacted with the recirculated exhaust gas to the cooling tower as make-up water to supplement the primary supply of cooling water;

measuring a pH of the first cooling and absorption liquid after exiting the cooling tower and prior to returning the cooled first cooling and absorption liquid to the first gas cooling and cleaning device; and adding a substance to the first cooling and absorption liquid in dependence upon the measurement to adjust the pH of the first cooling and absorption liquid prior to returning the cooled first cooling and absorption liquid to the first gas cooling and cleaning device.

2. The method according to claim 1, wherein the $SO_3$ binding-reagent is added in the form of a substantially homogeneous solution.

3. The method according to claim 1, wherein the recirculated exhaust gas after having been contacted with the first cooling and absorption liquid has
a total level of $SO_2$ and $SO_3$ lower than or equal to about 150 ppbv, and/or
a total level of Na and K lower than or equal to 5 ppbv.

4. The method according to claim 1, wherein a second portion of the exhaust gas originating from the turbine is contacted with a second cooling and absorption liquid in a second packed bed, so that a temperature of the second portion of the exhaust gas is lowered and contaminants are removed from the second portion of the exhaust gas, and is subsequently subjected to removal of $CO_2$.

5. The method according to claim 1, wherein a portion of the recirculated exhaust gas having been contacted with the first cooling and absorption liquid is subsequently subjected to removal of $CO_2$.

6. The method according to claim 1, wherein the recirculated exhaust gas has
a level of $SO_2$ of from about 0.5 ppmv to about 5 ppmv, and/or
a level of $SO_3$ of from about 0.5 ppmv to about 5 ppmv.

7. A combined cycle power generating system comprising:
a gas turbine unit having a compressor for compression of inlet air, a combustor for combustion of a fuel with the compressed inlet air to form an exhaust gas, and a gas turbine for expansion of the exhaust gas;
a steam generator utilizing heat of the exhaust gas originating from the gas turbine for generation of steam;
a steam turbine for expansion of the steam generated by the steam generator;
a condenser utilizing water as a cooling medium for condensation of the steam originating from the steam turbine;
a first cooling circuit for cooling of said water utilized as the cooling medium by the condenser and returning said water to the condenser, the first cooling circuit comprising a cooling tower for removal of heat from said water; and
a recirculation line for passing at least a first portion of the exhaust gas originating from the gas turbine to the compressor;
wherein the recirculation line comprises a first gas cooling and cleaning device having a first packed bed for contacting the first portion of the exhaust gas with a first cooling and absorption liquid in a counter current flow to perform cooling and absorption of the first portion of the recirculated exhaust gas in the first packed bed, to lower a temperature of the first portion of the exhaust gas and to remove contaminants from the first portion of the exhaust gas,
wherein the system further comprises a second cooling circuit for cooling of the first cooling and absorption liquid utilized by the first gas cooling and cleaning device and returning it to the first gas cooling and cleaning device, the second cooling circuit comprising said cooling tower of the first cooling circuit for removal of heat from said first cooling and absorption liquid;
wherein the system further comprising a pH control system configured to measure a pH of the first cooling and absorption liquid after exiting the cooling tower and prior to returning the cooled first cooling and absorption liquid to the first gas cooling and cleaning device, and to add a substance to the first cooling and absorption liquid to adjust the pH of the first cooling and absorption liquid in dependence upon the measurement prior to returning the cooled first cooling and absorption liquid to the first gas cooling and cleaning device;
wherein the recirculation line is provided with a reagent injector located upstream of the first gas cooling and cleaning device;
wherein the first cooling circuit and the second cooling circuit are in fluid communication with one another within the cooling tower such that acidity of the first cooling and absorption liquid reduces scaling resulting from alkalinity of the water utilized as the cooling medium.

8. The combined cycle power generating system according to claim 7, further comprising a line for passing a second portion of the exhaust gas originating from the gas turbine to a $CO_2$ capture unit, the line comprising a second gas cooling and cleaning device having a second packed bed for contacting the second portion of the exhaust gas with a second cooling and absorption liquid.

9. The combined cycle power generating system according to claim 7, wherein the recirculation line is connected, downstream of the first gas cooling and cleaning device, with a line for passing the first portion of the exhaust gas to a $CO_2$ capture unit.

10. An exhaust gas treatment system comprising:
a turbine unit having a compressor for compression of inlet air, a combustor for combustion of a fuel with the compressed inlet air to form an exhaust gas, and a turbine for expansion of the exhaust gas;
a recirculation line for passing at least a first portion of the exhaust gas originating from the turbine to the compressor, the recirculation line comprising a first gas cooling and cleaning device having a first packed bed for contacting the first portion of the exhaust gas with a first cooling and absorption liquid in a counter current flow to perform cooling and absorption of the recirculated exhaust gas in the first packed bed, to lower a temperature of the recirculated exhaust gas and to remove contaminants from the recirculated exhaust gas;
a cooling circuit for cooling of the first cooling and absorption liquid utilized by the first gas cooling and cleaning device, and returning the first cooling and absorption liquid to the first gas cooling and cleaning device, the cooling circuit comprising a cooling tower that receives a primary supply of cooling water for condensation of steam from a steam turbine, and receives at least a portion of the first cooling and absorption liquid for removal of heat from said first cooling and absorption liquid; and
a pH control system configured to measure a pH of the first cooling and absorption liquid after exiting the cooling tower and prior to returning the cooled first cooling and absorption liquid to the first gas cooling and cleaning device, and to add a substance to the first cooling and absorption liquid to adjust the pH of the first cooling and absorption liquid prior to returning the cooled first cooling and absorption liquid to the first gas cooling and cleaning device in dependence upon the measurement;

wherein the recirculation line is provided with a reagent injector located upstream of the first gas cooling and cleaning device.

11. The exhaust gas treatment system according to claim 10, further comprising a line for passing a second portion of the exhaust gas originating from the turbine to a $CO_2$ capture unit, the line comprising a second gas cooling and cleaning device having a second packed bed for contacting the exhaust gas with a second cooling and absorption liquid.

12. The exhaust gas treatment system according to claim 10, wherein the recirculation line is connected, downstream of the first gas cooling and cleaning device, with a line for passing a portion of the exhaust gas to a $CO_2$ capture unit.

* * * * *